United States Patent [19]

Walter et al.

[11] 3,876,186
[45] Apr. 8, 1975

[54] COMBINATION DRINK MIXING AND DISPENSING APPLIANCE

[75] Inventors: John Walter, Evergreen Park; Charles F. Seitz, Oak Park, both of Ill.

[73] Assignee: Sunbeam Corporation, Chicago, Ill.

[22] Filed: June 30, 1972

[21] Appl. No.: 267,895

[52] U.S. Cl. .............................................. 259/43
[51] Int. Cl. .................................................. B01f 15/02
[58] Field of Search ........... 222/385, 240, 241, 242, 222/239, 318, 228, 229, 231, 464; 259/43, 36, 44, 39, 105; 417/236, 238

[56] References Cited
UNITED STATES PATENTS

| | | | |
|---|---|---|---|
| 2,740,558 | 4/1956 | Steele | 222/385 X |
| 3,223,486 | 12/1965 | Holl, Jr. et al. | 259/43 X |

Primary Examiner—Stanley H. Tollberg
Attorney, Agent, or Firm—George R. Clark; Neil M. Rose; Clifford A. Dean

[57] ABSTRACT

A combination drink mixing and dispensing appliance which includes a container having an impeller-like agitator mounted in the bottom thereof for mixing the contents of the container and wherein the agitator serves as the impeller for a pump housing adapted to be fitted over the agitator and having a delivery tube arrangement associated therewith for dispensing the pumped liquid to a glass or the like disposed alongside the container. The pump housing has an open-bottomed lower chamber in which the agitator is received and an upper chamber in communication with the delivery tube arrangement. The fluids are centrifugally pumped from the lower chamber through upwardly inclined peripheral slots formed in the pump housing which provide fluid communication between the lower and upper pump chambers. External means are provided for rotating the impeller-like agitator.

17 Claims, 6 Drawing Figures

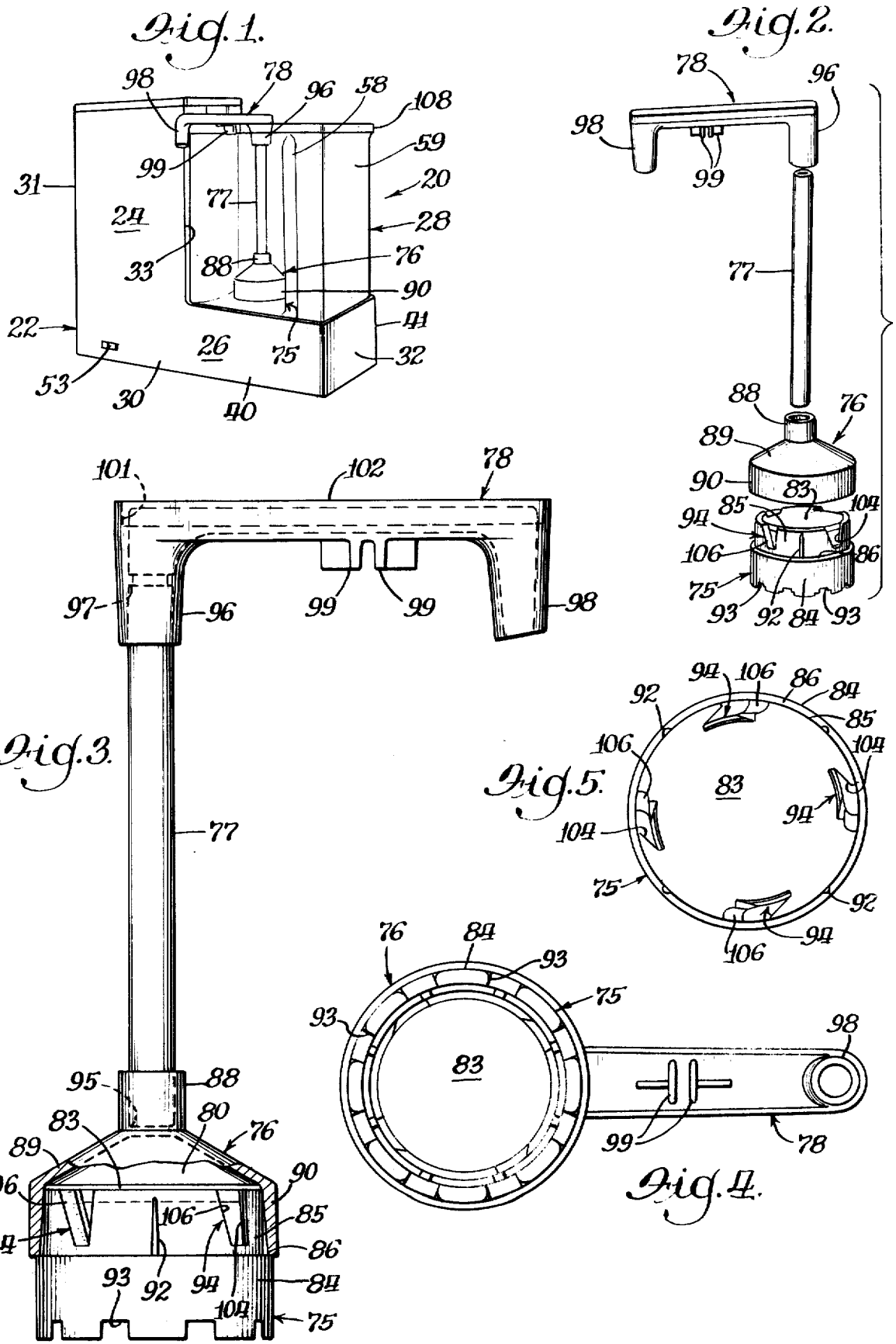

3,876,186

COMBINATION DRINK MIXING AND DISPENSING APPLIANCE

RELATED APPLICATION

This application is related to pending U.S. application, Ser. No. 226,157 filed Feb. 14, 1972 now U.S. Pat. No. 3,791,597 which is directed to a combination ice crusher-drink mixer appliance.

BACKGROUND OF THE INVENTION

1. Field of the Invention

Our present invention pertains to a combination drink mixing and dispensing appliance which not only mixes drinks in a container but also dispenses the mixed drinks through a pump device to glasses or the like positioned alongside of the container.

2. Description of the Prior Art

Drink mixers of all types are well known in the art but, to the best of our knowledge, there have been no combination appliances developed which combine a drink mixing feature with a drink dispensing feature as disclosed in our present invention. In all drink mixers of which we are aware, after a drink has been mixed in a container, the mixed drink is merely poured from the container into a glass or the like. Siphon arrangements may have been used in the past but, as far as we know, no centrifugal pump arrangements have been developed for use in dispensing mixed drinks from a container wherein the drink mixing agitator serves as the impeller for the pumping arrangement, as disclosed herein.

SUMMARY OF THE INVENTION

The present invention is concerned with a combination drink mixing and drink dispensing appliance wherein a drink may be mixed in a container and dispensed from the same container into a glass or the like disposed or held alongside the container without physically handling the container, as in a pouring operation. The appliance has a base portion upon which is supported a container having an impeller-like agitator mounted in its bottom with a drive shaft for the agitator projecting below the container bottom and being engageable with drive means provided in the base portion. The appliance also has a dispensing portion which includes a pump housing having upper and lower chambers and an open bottom whereby same may be fitted over impeller-like agitator. The pump housing is provided with inlet openings for the lower chamber and the upper chamber is in communication with a delivery tube arrangement including a vertically disposed tube having a horizontally disposed transfer tube connected to its upper end and with the transfer tube being adapted to project beyond the upper edges of the container and having a downwardly directed dispensing spout provided at its outer end. The pump housing is provided with a series of peripheral slots which provide communication between the upper and lower chambers of the pump housing with the leading edges of the slots being inclined upwardly and forwardly, in the direction of rotation of the agitator, and having a concave configuration to aid in centrifugal pumping of the mixed drink from the lower chamber into the upper chamber and through the delivery tube arrangement during operation of the agitator.

It is an object of the present invention to provide a new and novel combination drink mixing and dispensing appliance.

It is a further object of the present invention to provide such a combination appliance wherein a drink may be mixed and dispensed from the same container without physically handling the container as during a pouring operation.

It is still a further object of the present invention to provide such a combination appliance including a container having an impeller-like agitator, and a pump and delivery apparatus which utilizes the agitator as a pump impeller for dispensing the mixed drink to a delivery point external of the container.

Another object of the present invention is to provide such a combination appliance wherein a portion of the delivery apparatus is interengageable with the upper edge of the container for greater stability.

Yet another object of the present invention is to provide such a combination appliance wherein the pump housing is characterized by upper and lower chambers with the agitator being operable in the lower chamber, which chamber is open at its lower end, to centrifugally pump a mixture of liquids from the lower chamber to the upper chamber through a series of peripheral slots formed in the pump housing and extending between the two chambers, and thence, through the delivery apparatus to a glass or the like.

A still further object of the present invention is to provide such a combination appliance wherein the leading edges of the peripheral slots provided in the pump housing are inclined upwardly and forwardly, in the direction of rotation of the impeller-like agitator, and are provided with a concave configuration whereby the mixture being pumped from the lower chamber is given an upward swirling motion.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a combination drink mixing and dispensing appliance embodying our invention;

FIG. 2 is an exploded perspective view of the elements forming the drink dispensing portion of our invention;

FIG. 3 is an enlarged scale elevational view, shown partially in vertical section, of the fully assembled drink dispensing portion of our invention;

FIG. 4 is a bottom plan view of the drink dispensing portion of FIG. 3;

FIG. 5 is a top plan view of the lower pump housing member shown in FIGS. 2 and 3.

DESCRIPTION OF THE PREFERRED EMBODIMENT

Figure 6:
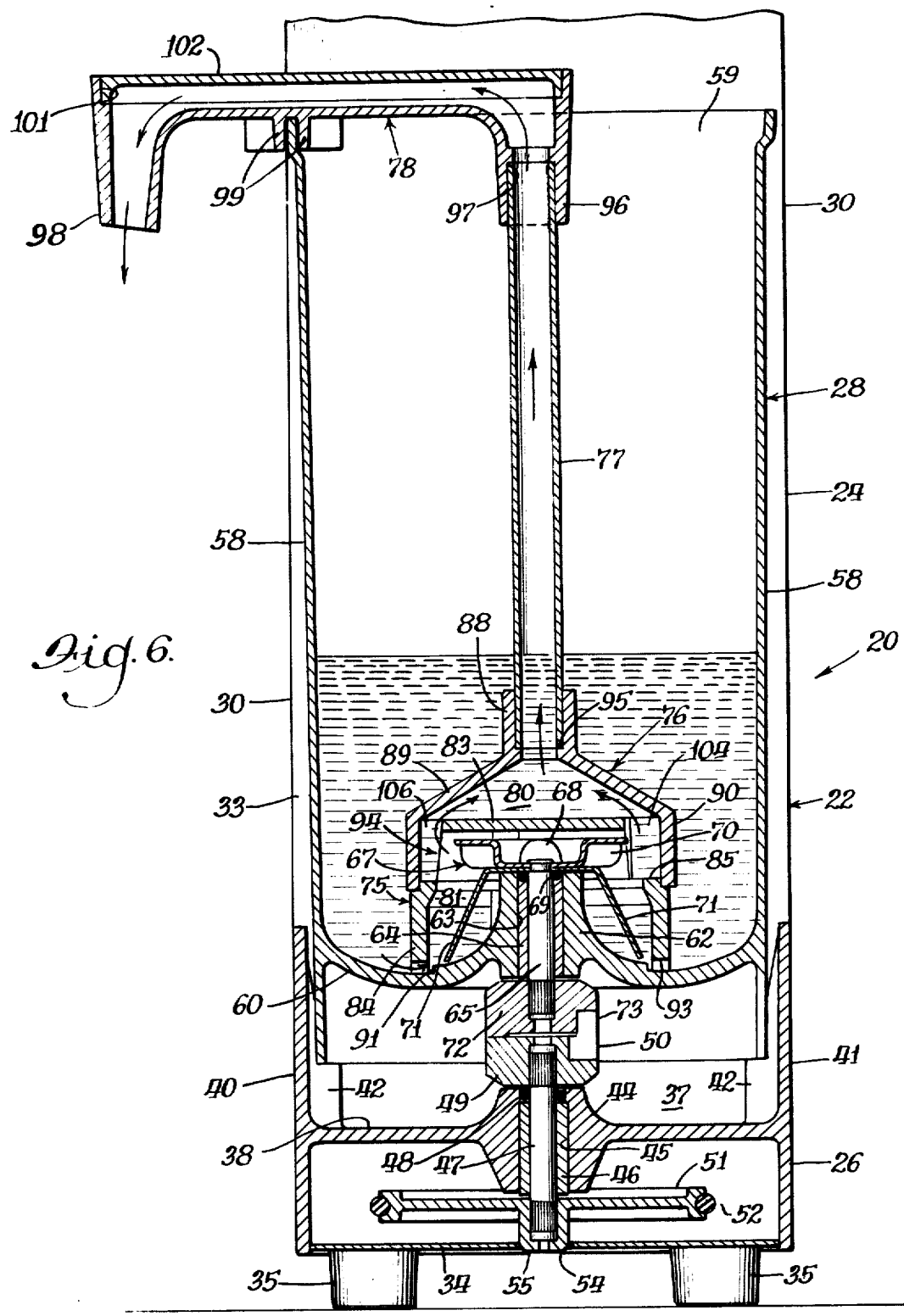
FIG. 6 is a transverse vertical sectional view taken through the combination appliance as shown in FIG. 1.

Referring now to the drawings in which like parts are designated by like numerals in the various views, there is shown in FIG. 1 a combination drink mixing and dispensing appliance which is designated generally by reference numeral 20 which embodies our invention. The combination appliance 20 includes a generally L-shaped housing 22 having a vertical leg portion 24 and a horizontal leg portion 26. A drink mixing and dispensing container 28 is supported on the horizontal leg portion 26 of the L-shaped housing in a manner to be described. Although it forms no part of the present invention and is now shown in the drawings, a vertically disposed ice crushing mechanism may be provided in the vertical leg portion 24 of the housing 22 for dispensing crushed ice directly into the container 28. Such an ice crushing mechanism is disclosed in U.S. application Ser. No. 226,157 filed Feb. 14, 1972. As shown in the above-identified pending application, an electric motor (not shown in this application) is provided in a lower portion of the vertical leg portion 24 of the housing 22 for actuating the ice crushing mechanism.

The housing 22, which may be molded in one piece of plastic, is characterized by front and back L-shaped walls 30, by an integral end wall 31 for the vertical leg portion 24, by an integral end wall 32 for the horizontal leg portion 26, and by an integral vertical wall 33 intermediate the vertical and horizontal leg portions 24 and 26, respectively. The open bottom of the housing 22 is closed by a thin metal plate 34 which has suitable supporting feet or pads 35 secured thereto.

A container-receiving cavity or dished-out recessed portion 37 is defined in the horizontal leg portion 26 of the housing 22 by a bottom wall 38 which is spaced approximately between the upper and lower edges of horizontal leg portions 40 and 41 of the L-shaped front and back walls 30. The integrally formed bottom wall 38 blends into the lower edge of the intermediate wall 33 and into the inner surfaces of the end wall 32 and the horizontal leg portions 40 and 41 of the L-shaped front and back walls 30 with a gentle curvature approximately midway between the upper and lower edges thereof.

For supporting the container 28 in the dished-out recessed portion 37, the front and back wall sections 40 and 41 are each provided on their inner surfaces with a pair of vertically disposed integral ribs 42. Although not shown in FIG. 6, the end wall 32 is preferably provided on its inner surface with a similar vertical rib, the upper surfaces of all of said ribs being spaced above the bottom wall 38 and adapted to support the bottom edges of the container 28 whereby same is supported above the bottom wall 38 of the dished-out recess portion 37 for a reason which will be made clear hereinafter.

The bottom wall 38 of the container-receiving cavity 37 is provided along its longitudinal center line with an integral boss 44 which extends both above and below the bottom wall 38 and which has a vertical bore 45 formed therein. As disclosed in the previously mentioned U.S. application Ser. No. 226,157, filed Feb. 14, 1972, the boss 44 may be off-center relative to the end wall 32 and the intermediate vertical wall 33 of the housing 22. A sleeve bushing 46 is provided in the bore 45 and has a shaft 47 rotatably mounted therein. An O-ring 48 is provided at the upper end of the bore 45 and a coupling member 49 having a series of upwardly projecting right-triangular clutch teeth 50 is press fitted on the upper end of the shaft 47.

A pulley 51 is press fitted on the lower end of the shaft 47 and a drive belt 52 extends around the pulley 51 and is drivingly connected to a suitable electric motor (not shown) which may be provided in the vertical leg portion of the housing 22. Preferably, the drive ratio between the electric motor and the coupling member 49 should be in the order of 1:1. The electric motor may be controlled by a suitable on-off switch 53 (FIG. 1). The bottom plate 34 of the housing 22 is provided with an opening 54 which accommodates a hub portion 55 of the pulley 51.

The drink mixing container 28 is generally rectangular in configuration and is characterized by front and back walls 58, end walls 59 and an integral bottom wall 60 which is spaced above the lower edges of the walls 58, 59 and which slopes generally conically downwardly from the walls 58, 59 to facilitate the feeding of ingredients into the agitator to be described hereinafter. The bottom edges of the walls 58, 59 are supported on the ribs 42 in the container-receiving recess 37 whereby the container 28 is supported above the bottom wall 38 of the container-receiving cavity 37.

As is apparent, the container 28 may be positioned in the container-receiving recess 37 in either of two 180° reversed positions. The bottom wall 60 of the container 28 is formed with an upstanding boss 62 which is centered relative to the fromt and back walls 58 of the container but which may be off-center relative to the end walls 59 of the container 28. However, in one of the two possible positions of the container 28 in the container-receiving recess 37, the boss 62 must be vertically aligned with the boss 44 of the container-receiving recess 37.

The boss 62 is provided with a vertical bore 63 in which is mounted a sleeve bushing 64. a shaft 65 is rotatably mounted in the sleeve bushing 64 and has an impeller-like drink-mixing agitator 67 secured to the upper end of the shaft 65 by means of forming-over the end of the shaft 65. An O-ring 69 is provided at the upper end of the bore 63 to prevent leakage of liquids from the container 28. The agitator 67 is characterized by a pair of diametrical flutes 70 disposed perpendicular to one another and by downwardly inclined mixing arms or blades 71 which insure adequate mixing of a minimum amount of liquid, such as for a single drink.

The lower end of the agitator shaft 65 extends slightly below the bottom wall 60 of the container 28 and has a coupling member 72 press fitted thereon. The coupling member 72 is provided with a series of depending right-triangular clutch teeth 73 and is identical to the coupling member 49 mounted on the drive shaft 47. When the container 28 is disposed in the container-receiving recess 37 with its boss 62 vertically aligned with the boss 44 provided in the container-receiving recess 37, the two coupling members 72 and 49 are disposed in meshed driving engagement. The container coupling member 72 does not depend below the bottom edges of walls 58, 59 of the container 28 whereby to insure stability of the container 28 when same is placed on a table or counter top.

The pumping and delivery tube portion of the present invention includes, as is best illustrated in FIG. 2, a lower pump housing 75, an upper pump housing 76, a vertical tube 77, and a horizontally disposed transfer tube 78. These four parts may all be formed of modified styrene (NAS) which has the necessary properties of strength, impact resistance and ability to hold dimensional tolerances as well as suitable food handling characteristics.

The two pump housings 75 and 76 are telescopically assembled, as shown in FIGS. 3 and 6, to provide a pump housing having an upper chamber 80 and a lower chamber 81. The lower pump housing 75 is in the form of an inverted handleless cup and is characterized by an open bottom, by a top wall 83, and by a generally cylindrical side wall 84 having the upper portion 85 adjacent the top wall 83 offset inwardly whereby to define an upwardly facing annular shoulder 86.

The upper pump housing 76 is in the form of an inverted funnel with an upwardly projecting axially bored neck portion 88, a conical top wall portion 89, a depending cylindrical skirt portion 90 and an open bottom. When the upper and lower pump housing are telescopically assembled, the skirt portion 90 of the upper pump housing 76 is fitted over the inwardly offset upper portion 85 of the of the lower pump housing 75 with the bottom edge of the skirt portion 90 being seated against the shoulder 86. The upper and lower pump chambers 80 and 81 are defined in part by the top wall 83 of the lower pump housing 75. a series of vertically disposed circumferentially spaced outer ribs 92 provided on the inwardly offset upper portion 85 of the lower pump housing 75 serves to provide a tight but non-binding fit between the upper and lower pump housings whereby to facilitate both assembly and disassembly thereof for cleaning purposes.

The inner diameter of the lower pump housing 75 is somewhat larger than the impeller-like agitator 67 whereby the open-bottom lower pump housing may be fitted thereover with the agitatior 67 being disposed within the lower pump chamber 81. An annular guide shoulder 91 is formed on the bottom wall 60 of the container as an aid in centering the lower pump housing 75 over the agitator 67. Fluid communication betweeen the lower pump chamber 81 and the liquid contents of the drink mixing container 28 is provided by a series of notch-like inlet ports 93 formed in the bottom edge of the side wall 84 of the lower pump housing 75 in circumferentially spaced relationship. Fluid communication between the pump chambers 80 and 81 is provided by a series of peripheral slots 94 to be described in detail hereinafter.

When assembled, the vertical tube 77 is fitted into the neck portion 88 of the upper pump housing 76 and seated against a shoulder 95 formed therein. The upper end of the vertical tube 77 terminates at a level slightly below the upper edges of the container walls 58, 59. One end 96 of the transfer tube 78 is turned downwardly and is adapted to receive the upper end of the vertical tube 77 which is seated against a shoulder 97 formed therein. The opposite end of the transfer tube 78 is turned downwardly to define a pouring spout or dispensing nozzle 98 for dispensing mixed drinks at a point outside of the container 28.

Intermediate the turned down portion 96 and the dispensing nozzle 98, the transfer tube 78 is provided on its upper side with a pair of spaced ribs 99 which are adapted to be fitted over the upper edge of one of the container walls 58 to provide additional stability for the pumping and delivery tube portion of the present invention. To facilitate cleaning of the transfer tube 78, it may be formed with an elongated opening 101 in its upper surface. A separate cover 102 is then provided which is adapted to be snapped into place in the opening 101.

Referring again to the peripheral slots 94 provided in the lower pump housing 75, it is noted, as best shown in FIGS. 3, 5 and 6, that four peripheral slots 94 are circumferentially spaced around the inwardly offset wall portion 85. Using the direction of rotation of the impeller-agitator 67 as a reference, the trailing edge 104 of each slot 94 is disposed vertically and is tapered outwardly in a forward direction to the outer surface of the wall portion 85. The leading edge 106 of each slot 94 is inclined upwardly and forwardly and is provided with a generally concave configuration. The upper edges of the peripheral slots 94 open through the top wall 83 of the lower pump housing 75 and thus into the upper pump chamber 80.

Thus, with the pumping and delivery assembly in position over the impeller-like agitator 67, during actuation of the agitator the mixed liquids in the container 28 are drawn into the lower pump chamber 81 through the inlet ports 93 and are centrifugally pumped upwardly through the peripheral slots 94 into the upper pump chamber 80 with the slot design described herein imparting an upward swirling motion to the pumped liquid. The pumped liquids then pass through the vertical tube 77 and the transfer tube 78 to the dispensing nozzle 98, as shown by the arrows in FIG. 6.

Should it be desirable to use the drink mixing appliance 20 disclosed herein without the drink dispensing portion thereof, the container 28 is provided at one of its upper corners with a pouring spout configuration 108 (FIG. 1). Although not shown in the drawings, the container 28 is preferably provided with a removable cover which serves to prevent spillage during the mixing of drinks, particularly when a larger volume of drinks is being mixed. Such a cover may be provided at one corner with a strainer configuration adapted to be positioned adjacent the pouring spout 108. The container 28 disclosed in the drawings may hold up to three pints of liquids and, although not shown, suitable measuring indicia may be molded on the container itself. In addition, portions of the side walls of the container 28 may be roughened and preformed to provide a slip-resistance hand grip configuration to facilitate manual pouring operations.

Although the combination appliance 20 may be used most often to prepare mixed alcoholic drinks, it is noted that it may also be used for the preparation of frozen juices, milk shakes and malts, instant breakfast, sauces and dressings of all types, etc.

While there has been shown and described a single embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the present invention.

What is claimed as new and desired to be secured by Letters Patent of the U.S. is:

1. A combination drink mixing and dispensing appliance comprising, a container having side walls and a bottom wall, an externally actuated impeller-like agitator rotatably mounted in the bottom wall of the container for mixing the contents thereof, and liquid conduit means characterized by a pump housing having an open bottom which is fitted over said agitator and by a tubing arrangement which extends from the upper end of said pump housing to a dispensing point outside of said container, said liquid conduit means serving to pump the mixed beverage from the container into a glass or the like positioned at said dispensing point during actuation of said agitator.

2. The appliance of claim 1 wherein said pump housing is characterized by upper and lower fluid chambers with said agitator being rotatable in said lower chamber, by fluid intake means for said lower chamber formed in said housing, and by peripheral slot means formed in said housing and providing fluid communication between said lower and upper chambers whereby during operation of said agitator fluid is centrifugally pumped from said lower chamber through said peripheral slot means into said upper chamber and through said tubing arrangement to said dispensing point.

3. The appliance of claim 2 wherein said peripheral slots are provided with upwardly and forwardly inclined edges having generally concave surfaces for imparting an upward swirling motion to said fluid as same is centrifugally pumped from said lower chamber into said upper chamber.

4. The appliance of claim 2 wherein said tubing arrangement is characterized by a length of vertical tubing connected at its lower end to said upper chamber of said pump housing, and by a horizontally disposed transfer tubing having one end adjustably connected to the upper end of said length of vertical tubing and having a downwardly turned pouring spout at its other end.

5. A combination drink mixing and dispensing appliance comprising, a container having a bottom wall and side wall means, an impeller-like agitator having a shaft rotatably mounted in said bottom wall of said container and being disposed in said container above said bottom wall for rotation about a vertical axis, external means for rotating said agitator to mix the contents of said container, and an apparatus having a generally cylindrical portion adapted to be downwardly fitted over said agitator in a manner encircling same such that during rotation of said agitator a pumping action is provided, said apparatus being further characterized by a vertical tube connected at its lower end to said apparatus portion, by a horizontally disposed transfer tube connected to the upper end of said vertical tube, and by a downwardly turned pouring spout at the outer end of said transfer tube for directing the pumped beverage into a glass or the like.

6. The combination recited in claim 5 wherein said container side wall means terminate in an upper edge, and wherein said horizontally disposed transfer tube is engageable with said upper edge of said container side wall means.

7. A combination drink mixing and dispensing appliance comprising a container having a bottom wall and side wall means, an impeller-like agitator having a shaft rotatably mounted in said bottom wall of said container and being rotatable in said container about a vertical axis, means external of said container for rotating said agitator, a pump housing having an open bottom adapted to be fitted over said agitator and having upper and lower chambers with said agitator being rotatable in said lower chamber, openings formed in said housing to place said lower chamber in fluid communication with the contents of said container, peripheral slot means formed on the inner surface of said housing and providing fluid communication between said lower and upper chambers whereby during operation of said agitator rotational movement is imparted to the fluids within said lower chamber with such fluids being centrifugally pumped through said slots into said upper chamber, and fluid conduit means extending upwardly from said upper chamber to a dispensing spout positionable outside of said container.

8. The appliance of claim 7 wherein said peripheral slots formed in said pump housing are characterized by having the trailing edges thereof being tapered outwardly in the direction of rotation of said agitator and by having the leading edges thereof being inclined upwardly and forwardly in the direction of rotation of said agitator and having a generally concave configuration whereby to impart an upward swirling action to the fluids whereby to aid in the pumping of same upwardly from said lower chamber into said upper chamber.

9. The appliance of claim 7 wherein said fluid conduit means comprises a length of vertical tubing connected at its lower end to said upper chamber of said pump housing, a horizontally disposed transfer tube connected to the upper end of said length of vertical tubing, and a downwardly turned pouring spout formed on the outer end of said horizontally disposed transfer tube.

10. The appliance of claim 9 wherein means are provided on the underside of said horizontally disposed transfer tube intermediate the ends thereof for gripping engagement with an upper edge of said container.

11. The appliance of claim 7 wherein said pump housing comprises a lower housing member having a configuration similar to an inverted handleless cup, and an upper housing member having a configuration similar to an inverted funnel having a depending cylindrical skirt portion.

12. The appliance of claim 11 wherein said lower housing member is characterized by a lower cylindrical portion with said fluid openings being formed in the bottom edge thereof, and by an upper cylindrical portion of a slightly smaller diameter over which said skirt portion of said upper housing member is telescopically fitted and having said peripheral slots formed therein and extending upwardly through an upper surface of said lower housing member to establish fluid communication with said upper chamber.

13. A combination drink mixing and dispensing appliance comprising, a container having a bottom wall and side wall means terminating in an upper edge, an impeller-like agitator rotatably mounted in said bottom wall of said container, external means for rotating said agitator to mix the contents of said container, an apparatus having a generally cylindrical portion adapted to be selectively fitted downwardly over said agitator in a manner encircling same such that during rotation of said agitator a pumping action is provided, said apparatus being further characterized by a vertical tube connected to said apparatus portion, by a horizontally disposed transfer tube connected to said vertical tube and adapted for engagement with said upper edge of said container side wall means, and by a downwardly turned pouring spout at the outer end for dispensing the mixed beverage into a glass or the like.

14. A combination drink mixing and dispensing appliance comprising, a container having a bottom and side wall means with said side wall means extending below said bottom, a pouring spout formed at the upper edge of said side wall means, a drink mixing agitator rotatably mounted in said bottom of said container and having a drive shaft therefor depending below said container bottom, means operably connected to said drive shaft for rotatably driving said agitator to mix the contents of said container and pump housing means positionable in said container over said agitator for dispensing a mixed drink to a discharge point external of said container during operation of said agitator.

15. The appliance of claim 14 wherein said pump housing means comprises upper and lower chambers with said lower chamber being open at the bottom to receive said agitator, inlet ports formed in the portion of said housing means defining said lower chamber, a series of peripheral slots formed in said pump housing means and providing communication between said lower chamber and said upper chamber whereby during operation of said agitator rotational movement is imparted to the fluids within said lower chamber with said fluids being centrifugally pumped through said peripheral slots into said upper chamber, and fluid conduit means extending upwardly from said upper chamber to a dispensing spout positionable at said discharge point external of said container.

16. A pump device comprising a housing adapted to be positioned in a container of liquid below the surface level thereof and having first and second chambers, inlet port means formed in said housing for said first chamber, said first chamber being adapted to have an impeller rotatable therein, outlet port means formed in said housing for said second chamber, tubing means connected to said outlet port means and adapted to extend upwardly to a point above the upper edge of said container and then laterally past an edge of said container, a downwardly turned dispensing spout formed at the outer end of said tubing means, and a series of peripheral slots formed in said housing and providing liquid communication between said first and second chambers whereby liquid may be centrifugally pumped from said first chamber into said second chamber and through said tubing means to said dispensing spout, said peripheral slots being inclined upwardly and forwardly with the leading edges having a generally concave configuration.

17. A pump device comprising a first housing portion having a cylindrical side wall, inlet ports formed in said side wall, a top wall and an open bottom whereby same is adapted to be fitted over an impeller rotatable in a container of liquid, a second inverted funnel-shaped housing portion having a depending skirt portion telescopically fitted over the upper portion of said first housing portion with the upper open stem end of said second housing portion defining an outlet port, tubing means connected at its lower end to said stem end of said second housing portion and having its opposite end disposed above and outwardly of the container and defining a dispensing spout, and a series of peripheral slots formed in said first housing portion and providing fluid communication between said first and second housing portions whereby liquid may be centrifugally pumped from said first housing portion through said peripheral slots into said second housing portion and through said tubing means to said dispensing spout, said peripheral slots being inclined upwardly and fowardly and extending through said top wall of said first housing portion with the leading edges thereof having a generally concave configuration whereby to impart an upward swirling motion to the centrifugally pumped liquid.

* * * * *